(12) United States Patent
Sip

(10) Patent No.: US 8,217,639 B2
(45) Date of Patent: Jul. 10, 2012

(54) SYSTEM FOR SUPPLYING AND RECEIVING POWER, POWER SUPPLY DEVICE AND METHOD THEREOF

(75) Inventor: Kim-Yeung Sip, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 454 days.

(21) Appl. No.: 12/503,854

(22) Filed: Jul. 16, 2009

(65) Prior Publication Data
US 2010/0039081 A1    Feb. 18, 2010

(30) Foreign Application Priority Data

Aug. 13, 2008   (CN) .......................... 2008 1 0303747

(51) Int. Cl.
*G06F 1/26*    (2006.01)
*H02J 1/00*    (2006.01)

(52) U.S. Cl. ........................ 323/318; 713/310; 713/340

(58) Field of Classification Search .................. 713/300, 713/320, 340, 310; 323/282, 283, 284, 285, 323/318, 350, 351
See application file for complete search history.

(56) References Cited

U.S. PATENT DOCUMENTS

| | | | |
|---|---|---|---|
| 6,580,597 B2 * | 6/2003 | Kanouda et al. | 361/502 |
| 7,205,751 B2 * | 4/2007 | Rudiak | 323/271 |
| 7,366,929 B1 * | 4/2008 | Mimberg | 713/310 |
| 7,512,825 B2 * | 3/2009 | Winick et al. | 713/340 |
| 7,523,337 B2 * | 4/2009 | Borkar et al. | 713/340 |
| 7,737,672 B2 * | 6/2010 | Kudo | 323/284 |
| 8,035,368 B2 * | 10/2011 | May | 323/318 |
| 8,063,618 B2 * | 11/2011 | Lam et al. | 323/282 |

\* cited by examiner

*Primary Examiner* — Gary L Laxton
(74) *Attorney, Agent, or Firm* — Altis Law Group, Inc.

(57) ABSTRACT

A power supply device includes a power input unit, a voltage converting unit, a communication unit, a control unit. The power input unit is used for receiving an external power source. The voltage converting unit is used for converting the voltage of the external power source to a predetermined voltage. The communication unit is used for obtaining working voltage information of a power receiving device connected to the power supply device. The control unit is used for controlling the voltage converting unit to output a working voltage indicated by the working voltage information to the power receiving device.

7 Claims, 2 Drawing Sheets

SYSTEM FOR SUPPLYING AND RECEIVING POWER, POWER SUPPLY DEVICE AND METHOD THEREOF

BACKGROUND

1. Technical Field

The disclosure relates to electronic devices and, particularly, to a power supply device and a method for providing power.

2. Description of Related Art

Nowadays, electronic devices such as mobile phones and media players are more and more popular. Usually, the electronic devices require power adapters. However, different electronic devices have different working voltages, for example, some types of digital photo frames use a 7 volts (V) power supply, whereas some other types of portable computers use 19 V power supply. Therefore, for each electronic device, a user might need a different adapter, which is inconvenient for the user.

Therefore, it is necessary to provide a power supply device and a method to overcome the above-identified deficiencies.

BRIEF DESCRIPTION OF THE DRAWINGS

The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
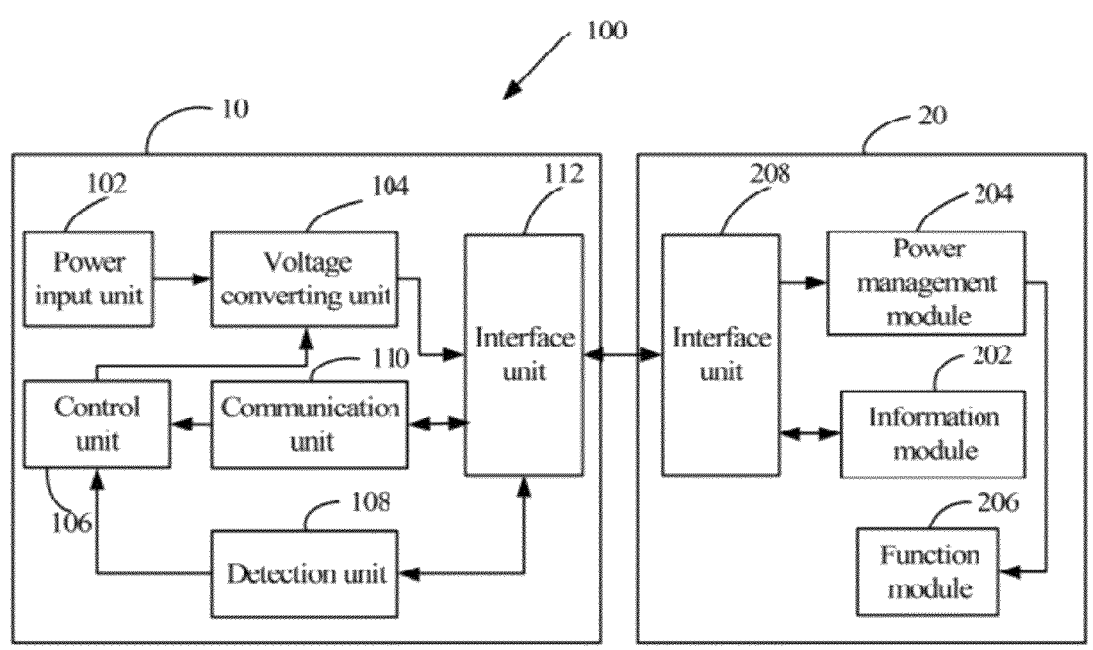
FIG. 1 is a block diagram showing a system for supplying and receiving power in accordance with an exemplary embodiment.

Referring to FIG. 1, a power supply system 100 includes a power supply device 10 and a power receiving device 20. The power supply device 10 is capable of providing suitable voltage to the power receiving device 20.

The power supply device 10 includes a power input unit 102, a voltage converting unit 104, a control unit 106, a detection unit 108, a communication unit 110, and an interface unit 112. The power receiving device 20 includes an information module 202, a power management module 204, and an interface unit 208. The interface unit 112 of the power supply device 10 is connected to the interface unit 208 via a cable, so that the power supply device 10 is able to supply power to the power receiving device 20 via the interface units 112 and 208. The cable can be a USB cable, an IEEE 1394 cable, or the like.

The power input unit 102 of the power supply device 10 is configured to connect to an external power source, such as an alternating current power source. The voltage converting unit 104 is configured for converting the voltage of the external power source to a predetermined voltage level, such as 12 Volts. The detection unit 108 is configured to detect a state of the power receiving device 20 and determine whether there is a need to provide power to the power receiving device 20 according to the state of the power receiving device 20. The detection unit 108 is also configured to produce a control signal when there is a need to provide power to the power receiving device 20. In the embodiment, the detection unit 108 is connected to the interface unit 112 of the power supply device 10, when the interface unit 112 of the power supply device 10 is connected to the interface unit 208 of the power receiving device 20, the detection unit 108 is electrically connected to the interface unit 208 of the power receiving device 20. If the detection unit 108 detects a power pin of the interface unit 208 of the power supply device 10 is at a low voltage level, the detection unit 108 determines that the power receiving device 20 is at a power-low state and needs to be powered, and the detection unit 108 produces the control signal accordingly.

The control unit 106 is configured to control the voltage converting unit 104 to output a communication voltage to the information module 202 of the power receiving device 20 when receiving the control signal, the communication connection between the communication unit 110 and the information module 202 is established via the interface units 112 and 208. In the embodiment, the information module 202 stores working voltage information indicating the working voltage capable of and enough for maintaining the power receiving device 20 at a normal work state. The information module 202 is enabled by the communication voltage. The communication unit 110 produces a request signal to the information module 202 and obtains the working voltage information of the power receiving device from the information module 202. The control unit 106 controls the voltage converting unit 104 to convert the power of the external power source to the corresponding working voltage for the power receiving device 20. The power receiving device 20 further includes a plurality of function modules 206, such as a processor, a memory, a display, etc. The function modules 206 of the power receiving device 20 are configured to execute the functions of the power receiving device 20 after the power receiving device 20 is turned on by the users. The power management module 204 receives the power from the voltage converting unit 104 of the power supply device 10 and then distributes the power to a function module 206.

In another embodiment, the power supply device 10 includes a plurality of interface units 112 and is capable of connecting with a corresponding number of power receiving devices 20, the power supply device 10 is capable of providing corresponding working voltages to each power receiving device 20.

Therefore, use the power supply device 10, can provide suitable voltage to a plurality of power receiving devices 20 simultaneously.

Figure 2:
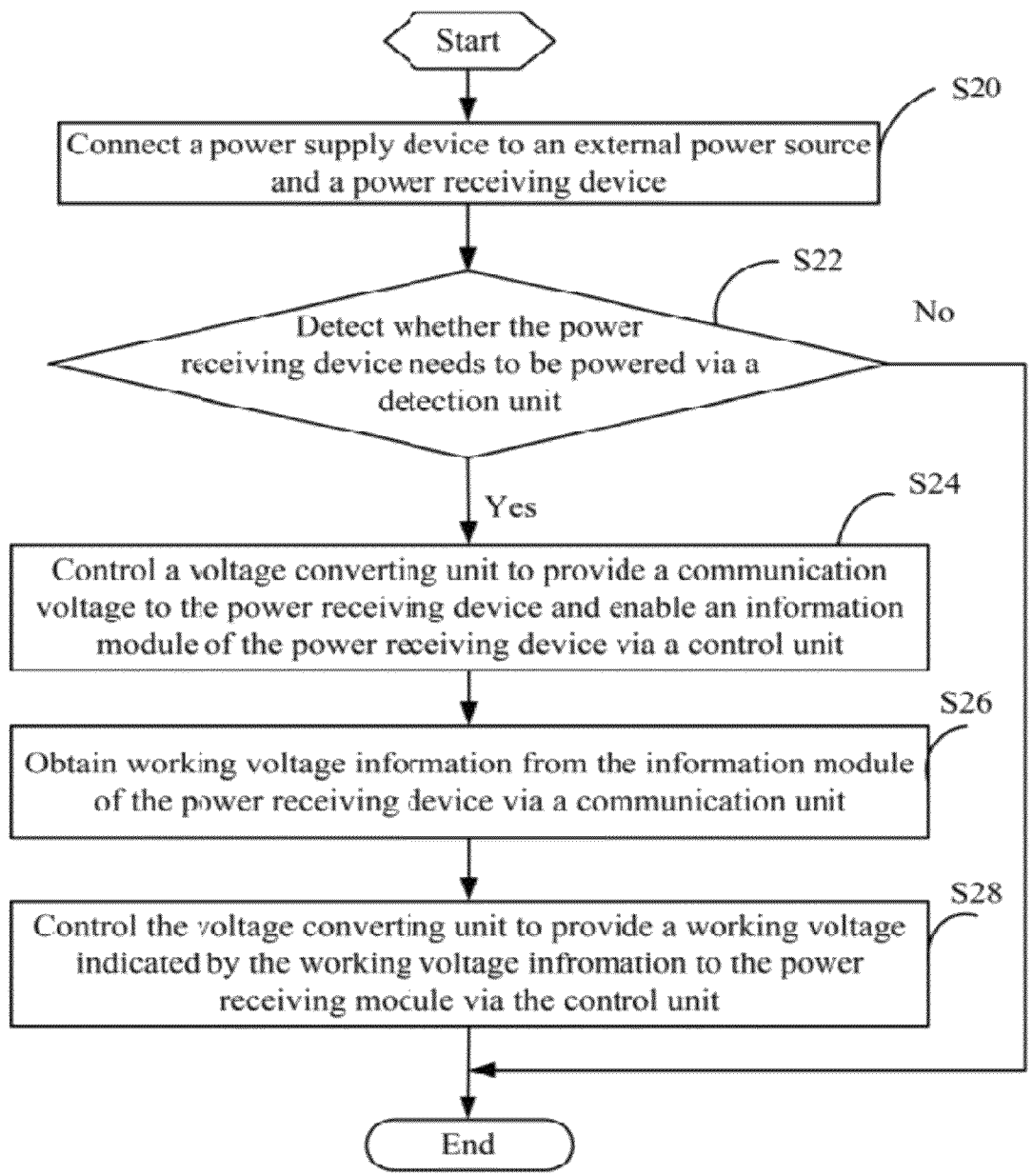
FIG. 2 is a flowchart illustrating an exemplary method for providing power in accordance with an exemplary embodiment.

FIG. 2 is a flowchart illustrating a method for supplying power to a power receiving device employing the power supply device 10 described above. In step S20, the power supply device 10 is connected both to an external power source and a power receiving device 20.

In step S22, the detection unit 108 of the power supply device 10 detects whether the power receiving device 20 needs to be powered, for example, the detection unit 108 detects whether the power receiving device 20 is at a power-low state, if it is, then the detection unit 108 determines that the power receiving device 20 is in need to be powered, otherwise, the detection unit 108 determines that the power receiving device 20 does not need to be powered.

If the power receiving device 20 does not need to be powered, the process ends, otherwise, in step S24, in the power supply device 10, the control unit 106 controls the voltage converting unit 104 to provide a communication voltage to the power receiving module 20 and enables the information module 202 of the power receiving module 20.

In step S26, the communication unit 110 obtains the working voltage information indicating the working voltage capable of and enough for maintaining the power receiving device 20 at a normal work state from the information module 202.

In step S28, the control unit 106 controls the voltage converting unit 104 to provide the working voltage indicated by the working voltage information to the power receiving device 20 to power the power receiving device 20.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the present disclosure.

What is claimed is:

1. A power supply device, comprising:
   a power input unit configured for connecting with an external power source and obtaining power from the external power source;
   a first interface unit configured for connecting with a power receiving device and outputting power to the power receiving device;
   a voltage converting unit configured for converting the voltage of the external power source to a predetermined voltage;
   a detection unit configured for detecting whether the power receiving device needs to be powered, and producing a control signal when the power receiving device needs to be powered, and further configured for controlling the voltage converting unit to provide a communication voltage to the power receiving device to establish a communication connection between the power supply device and the power receiving device according to the control signal;
   a communication unit configured for obtaining working voltage information from the power receiving device after the communication connection between the power supply device and the power receiving is established, the working voltage information indicating a working voltage to maintain a normal work state of the power receiving device; and
   a control unit configured for controlling the voltage converting unit to convert the voltage of the external power source to the working voltage of the power receiving device to power the power receiving device.

2. The power supply device of claim 1, wherein the detection unit is electrically connected with a power pin of a second interface unit of the power receiving device, and is configured for determining the power receiving device needs to be powered when the power pin of the second interface unit of the power receiving device is at a low voltage level.

3. A system for supplying and receiving power, the system comprising: a power supply device configured for supply power and a power receiving device configured for receiving power from the power supply device; wherein, the power supply device comprises:
   a power input unit configured for connecting with an external power source and obtaining power from the external power source;
   a first interface unit configured for connecting with the power receiving device;
   a voltage converting unit configured for converting the voltage of the external power source to a predetermined voltage;
   a detection unit configured for detecting whether the power receiving device needs to be powered, and producing a control signal when the power receiving device needs to be powered, and further configured for controlling the voltage converting unit to provide a communication voltage to the power receiving device to establish a communication connection between the power supply device and the power receiving device according to the control signal;
   a communication unit configured for obtaining working voltage information from the power receiving device after the communication connection between the power supply device and the power receiving is established, the working voltage information indicating a working voltage to maintain a normal work state of the power receiving device; and
   a control unit configured for controlling the voltage converting unit to convert the voltage of the external power source to the working voltage of the power receiving device to power the power receiving device; and
   the power receiving device comprises:
   a second interface unit configured for connecting with the first interface unit of the power supply device; and
   an information module configured for storing working voltage information of the power receiving device.

4. The system of claim 3, wherein the detection unit is electrically connected with a power pin of the second interface unit of the power receiving device, the detection unit determines the power receiving device needs to be powered when it detects the power pin of the second interface unit of the power receiving device is at low voltage level.

5. The system of claim 3, wherein the power receiving device further comprises a power management module and a plurality of function modules, and the power management module is connected to the second interface unit of the power receiving device, and is configured for receiving the power from the voltage converting unit and distributing the power to the function modules.

6. A method for powering a power receiving device using a power supply device, the power supply device comprising:
   a first interface unit;
   a voltage converting unit;
   a communication unit;
   a control unit; and
   a detection unit;
   the method comprising:
   connecting the first interface unit of the power supply device with a second interface unit of the power receiving device;
   detecting whether the power receiving device needs to be powered via the detection unit;
   producing a control signal when the detection unit determines the power receiving device needs to be powered;
   controlling the voltage converting unit to output a communication voltage to the power receiving device according to the control signal, and establishing a communication connection between the power supply device and the power receiving device;
   obtaining working voltage information of the power receiving device from the power receiving device via the communication unit after the communication connection between the power supply device and the power receiving device is established, wherein the working voltage information indicates a working voltage to maintain a normal work state of the power receiving device; and
   controlling the voltage converting unit to convert a voltage of an external power source to the working voltage via the control unit and powering the power receiving device with the working voltage.

7. The method of claim 6, wherein detecting whether the power receiving device needs to be powered via the detection unit comprises:

detecting whether a power pin of the second interface unit of the power receiving device is at low voltage level via the detection unit; and determining that the power receiving device is in need to be powered when the detection unit detects the power pin of the second interface unit of the power receiving device is at low voltage level.

* * * * *